United States Patent
Maass et al.

(10) Patent No.: US 10,017,084 B2
(45) Date of Patent: Jul. 10, 2018

(54) HEAD REST FOR A MOTOR VEHICLE

(71) Applicant: GM GLOBAL TECHNOLOGY OPERATIONS LLC, Detroit, MI (US)

(72) Inventors: Matthias Maass, Ruesselsheim (DE); Daniel Assefa, Ruesselsheim (DE)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 15/383,856

(22) Filed: Dec. 19, 2016

(65) Prior Publication Data

US 2017/0174107 A1  Jun. 22, 2017

(30) Foreign Application Priority Data

Dec. 19, 2015 (DE) .................. 10 2015 016 657

(51) Int. Cl.

| B60N 2/48 | (2006.01) |
|---|---|
| B60N 2/812 | (2018.01) |
| B60N 2/44 | (2006.01) |
| B60N 2/90 | (2018.01) |

(52) U.S. Cl.
CPC ............ *B60N 2/812* (2018.02); *B60N 2/442* (2013.01); *B60N 2/4811* (2013.01); *B60N 2/919* (2018.02)

(58) Field of Classification Search
CPC ...... B60N 2/812; B60N 2/4811; B60N 2/442; B60N 2/919
USPC ................................................. 297/391, 410
See application file for complete search history.

(56) References Cited

U.S. PATENT DOCUMENTS

| 3,512,833 | A | | 5/1970 | Sugiura | |
|---|---|---|---|---|---|
| 5,860,703 | A | | 1/1999 | Courtois et al. | |
| 5,895,094 | A | * | 4/1999 | Mori | B60N 2/4814 297/391 |
| 5,934,755 | A | * | 8/1999 | Halamish | B60N 2/4817 297/391 |
| 6,012,777 | A | * | 1/2000 | Wege | B60N 2/4814 297/391 |
| 7,255,401 | B2 | * | 8/2007 | Yokoyama | B60N 2/4817 297/410 |
| 7,506,936 | B2 | * | 3/2009 | Saberan | B60N 2/4829 297/410 X |

(Continued)

FOREIGN PATENT DOCUMENTS

| DE | 29601956 U1 | 3/1996 |
|---|---|---|
| EP | 1712408 A1 | 10/2006 |

(Continued)

OTHER PUBLICATIONS

German Patent Office, German Search Report for German Application No. 102015016657.3, dated Aug. 2, 2016.

*Primary Examiner* — Rodney B White
(74) *Attorney, Agent, or Firm* — Lorenz & Kopf, LLP

(57) ABSTRACT

A headrest arrangement on a motor vehicle the head rest assembly includes a headrest, a back rest, and at least a guide rod. The guide rod connects the back rest with the headrest. The headrest is adjustable between a first locking position and at least a second lock position. The headrest arrangement can occupy an adjustment and a lock mode while in lock mode the head rest in a lock position is locked and the headrest from the first to the at least second locking position is adjustable in the adjustment mode. The backrest includes a locking facility with a lock body to lock the headrest in the lock position.

18 Claims, 6 Drawing Sheets

(56) References Cited

U.S. PATENT DOCUMENTS

| | | | |
|---|---|---|---|
| 7,621,597 B2* | 11/2009 | Oda | B29C 45/14549 297/391 |
| 8,356,863 B2* | 1/2013 | Arcidiacone | B21D 17/02 297/391 |
| 2001/0013718 A1* | 8/2001 | Beck | B60N 2/20 297/410 |
| 2003/0222492 A1* | 12/2003 | Nemoto | B60N 2/4814 297/410 |
| 2005/0280305 A1 | 12/2005 | Gurtatowski et al. | |
| 2009/0235711 A1 | 9/2009 | Pesch et al. | |

FOREIGN PATENT DOCUMENTS

| | | |
|---|---|---|
| JP | 2013107573 A | 6/2013 |
| WO | 2009025541 A1 | 2/2009 |

* cited by examiner

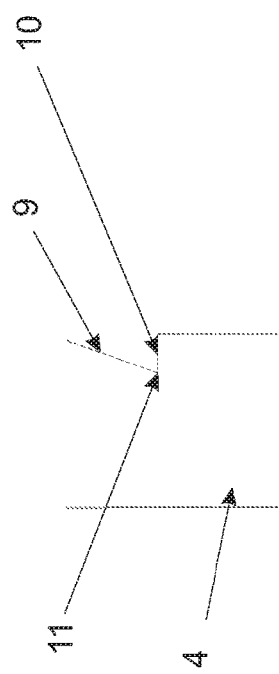
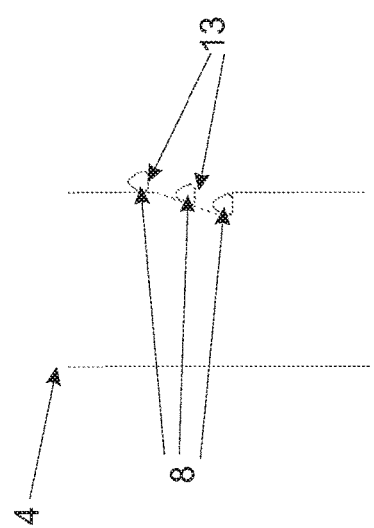

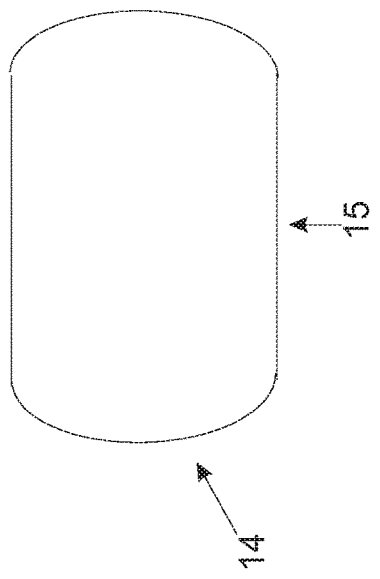
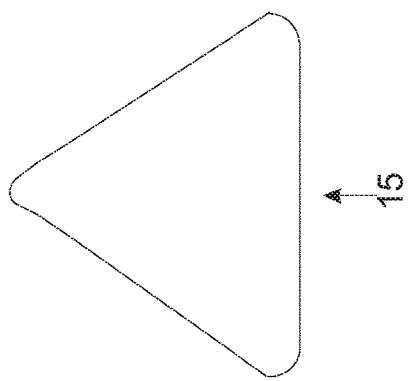
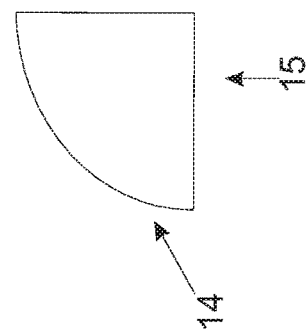
Fig 5a
Fig 5b
Fig 5c

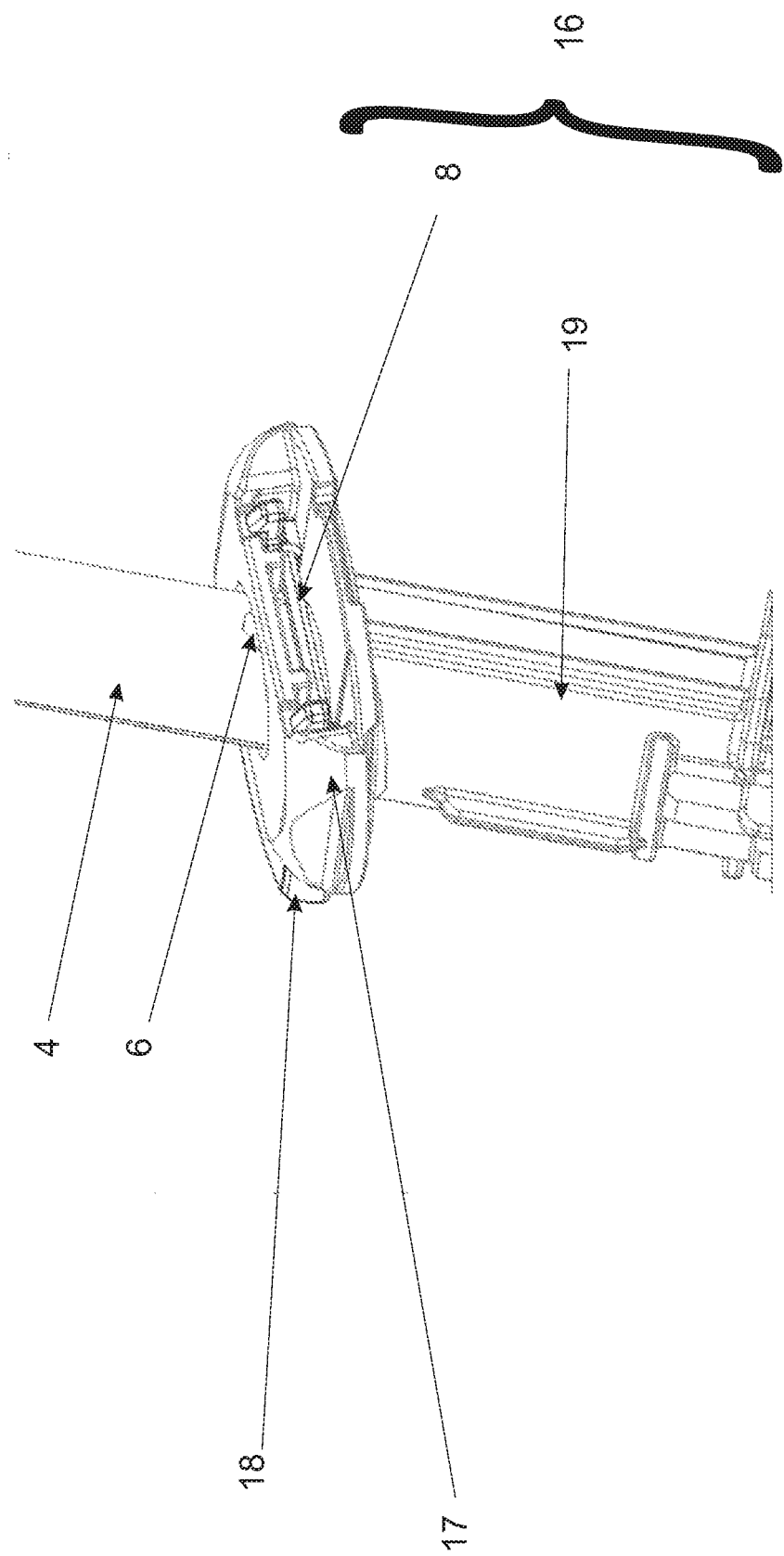

HEAD REST FOR A MOTOR VEHICLE

CROSS-REFERENCE TO RELATED APPLICATION

This application claims priority to German Patent Application No. 102015016657.3, filed Dec. 19, 2015, which is incorporated herein by reference in its entirety.

TECHNICAL FIELD

The invention relates to a headrest assembly for a motor vehicle, a vehicle seat with a headrest assembly, as well as a motor vehicle with a headrest assembly.

BACKGROUND

Already known in the art are headrest assemblies for motor vehicles whose position can be adjusted relative to the seatback, e.g., in height. Such headrest assemblies often exhibit a headrest, a guide rod and a locking pin, wherein the locking pin keeps the headrest in its vertical position.

For example, publication EP 0 822 117 B1 describes a vehicle seat with a backrest, which is upwardly elongated by a headrest. The headrest is held by at least one rigid pin, which vertically glides with a certain pivoting clearance toward the front in a bushing joined with the backrest. The headrest is angularly pressed toward the back into a rest position by a spring that is held in front of the bushing and acts on the pin. In the rest position, a locking member rigidly joined with the bushing prevents the pin from vertically sliding.

SUMMARY

The object of the invention is to provide a headrest with a functionally improved adjusting device.

Proposed is a headrest assembly for a vehicle seat in a vehicle, in particular an automobile or truck. The headrest assembly encompasses a backrest, a headrest and at least one guide rod. The at least one guide rod connects the backrest with the headrest. In a particularly preferred embodiment, the headrest assembly encompasses two guide rods, so that the headrest cannot be turned around the guide rod. The at least one guide rod is preferably joined as a single piece with the headrest; in particular, the at least one guide rod can be inserted into the backrest, for example. The at least one guide rod preferably exhibits a rectangular cross section. Alternatively, the at least one guide rod exhibits a circular cross section. In particular, the guide rod is designed as a hollow body. Alternatively, the guide rod is a solid body.

The headrest can be adjusted between a first locking position and at least one second locking position. In particular, the respective locking position of the headrest defines the respective vertical distance of the headrest from the backrest, wherein this vertical distance is referred to below as the first possible height, and the second vertical distance is referred to as the second possible height. In particular, the locking position can only be incrementally adjusted.

The headrest assembly can assume an adjustment mode and locking mode. In the locking mode, the headrest is locked in one of the at least two locking positions. As a consequence, the height of the headrest cannot be inadvertently changed. In particular, each locking position is arranged in the correspondingly possible adjustable height. In the adjustment mode, the headrest can be adjusted between the two locking positions, in particular from one locking position into the second locking position, and/or can be adjusted by a motor vehicle passenger.

The at least one guide rod encompasses at least two axially spaced apart latching notches, wherein at least one of the latching notches is designed as a catching notch. The latching notches are preferably located at the height of the first and at least one second locking positions. In an especially preferred embodiment, the latching notch is located at the maximum adjustable height and/or maximum adjustable locking height. In particular, the number of locking positions corresponds to the number of latching notches. Specifically, the latching notches are aligned parallel alongside the longitudinal axis of the guide rod, and/or cover the guide rod as viewed axially from above. In particular, the locking mode is only durably stable when a locking body engages into the latching notch.

The at least one latching notch is preferably designed as a recess in the guide rod. Alternatively, the recess is designed as an indentation in the guide rod or as a milled slot, for example.

The catching notch preferably exhibits a wedge shape when viewed as a lateral sectional image. The catching notch exhibits a latching surface and a sliding surface. The latching surface is designed as a bearing surface. The latching surface serves to lock the headrest by latching, so that the headrest can be stabilized at a constant height. The sliding surface is a surface with preferably a low roughness, upon which another body can glide. The bearing surface is preferably larger than 1 square millimeter, in particular larger than 10 square millimeters, and in particular larger than 20 square millimeters. In particular, the bearing surface is flat and/or devoid of curvatures. The sliding surface forms a surface inclined at an angle relative to the axial plane of the guide rod. The sliding surface runs without curvatures and evenly, or curvedly. The sliding surface includes an angle of inclination with the axial plane of the guide rod. The angle of inclination preferably measures at least 10 degrees, preferably at least 30 degrees, and/or maximally 80 degrees. As a supplemental option, an additional connecting surface can lie between the sliding surface and latching surface. In particular, the sliding surface and latching surface intersect in a straight line, wherein this straight line forms the catching notch edge.

The backrest exhibits a locking device for locking the headrest at a height. The locking device can be invisibly incorporated into the backrest. The locking device is in active contact with the at least one guide rod, so that the locking device can lock the headrest at a height via direct interaction, for example through frictional forces or positive engagement. The locking device encompasses a locking body for locking the headrest in the locking position.

The locking body encompasses a locking surface and a rounded edge region. In particular, the locking surface is larger than 1 square millimeter, preferably larger than 10 square millimeters, and in particular larger than 20 square millimeters, since as the locking surface becomes larger, the friction or positive engagement and interaction between the locking body and guide rod increases.

The rounded edge region preferably extends over the entire length of a lateral edge of the locking body. Alternatively, the rounded edge region can comprise only a portion of the length of a lateral edge of the locking body. The rounded edge region is preferably longer than 2 millimeters, in particular longer than 5 millimeters, and especially longer than 10 millimeters. In a particularly preferred embodiment, the rounded edge region forms the lateral termination of the locking surface on at least one side. In particular, two adjacent, rounded edge regions can transition into each other and form a surface with a radial progression. For example, two edge regions rounded as quarter cylinders together comprise a half cylinder. The longitudinal extension of the rounded edge region is preferably designed perpendicular to the longitudinal extension of the guide rod. Alternatively, the longitudinal extension of the guide rod and longitudinal extension of the rounded edge region include an angle of at least 40 degrees, and maximally 90 degrees. In particular, the longitudinal extension of the rounded edge region is parallel to the catching notch edge.

The radius of curvature for the rounded edge region is formed in a cross sectional plane relative to the longitudinal extension of the edge region. In particular, the radius of curvature forms a constant cross sectional profile in the longitudinal extension of the locking body. The rounded edge region adjoins the locking surface. The rounded edge region preferably points toward and/or into the catching notch edge. In particular, the locking surface and a second surface that joins the locking surface with the rounded edge region intersect each other at an angle of less than 90 degrees, so that the second surface does not run parallel to the longitudinal axis of the guide rod.

In the locking mode, the locking surface of the locking body flatly contacts the latching surface. In particular, the locking surface and latching surface of the catching notch are positively joined together in the locking mode. The locking surface and latching surface are preferably congruent, and in complete contact with each other in the locking mode. The locking surface rests on the latching surface in the locking mode. In particular, the locking body engages into the latching notch in the locking mode, and the locking surface rests flatly on the latching surface. The rounded edge region linearly contacts the sliding surface in the adjustment mode. In particular, the latching body engages into the catching notch given a strong upward acceleration of the guide rod, for example during an accident. In particular, a strong upward acceleration is an acceleration of more than 10 g toward the motor vehicle roof.

The advantage to the invention is that the locking body combines the advantages of a locking head having a round cross section with the advantages of a rectangular cross section. A locking body with a round cross section reduces the friction between the locking body and sliding surface, and thus ensures low adjustment forces. The disadvantage to a locking body with a round cross section is that the locking body only exhibits a comparatively small locking surface, with which the locking body can rest upon the latching surface of the guide rod, and latch with the latter. As a result, the headrest can slide down in the case of accidents or strong acceleration. A locking body with a polygonal cross section exhibits a comparatively large locking surface, with which the locking body can rest upon the latching surface and latch with the latter, making it possible to prevent the headrest from sliding out, e.g., in the event of an accident. However, the disadvantage here is that a locking body with a polygonal cross section is also in contact with the guide rod over a large surface even in the adjustment mode, so that high frictional forces must be offset while adjusting the height of the headrest. In the embodiment according to the invention, using the locking surface and rounded edge region combines the advantages of the one locking body having a polygonal cross section with the advantages of a locking body having a round cross section, while their individual disadvantages are not encountered.

In an especially preferred embodiment, the latching surface lies in a radial plane of the guide rod. In particular, radial planes for guide rods without a round cross section are planes for which the longitudinal axis of the guide rod forms a normal vector. The latching surface takes up only a portion of the radial sectional surface, wherein the latching surface exhibits a latching surface length L that extends from the outer boundary of the radial sectional surface into the radial sectional surface. Given a radial sectional surface with diameter D, the latching surface length is less than 0.4*D, in particular less than 0.2*D, and especially less than 0.1*D.

In an alternative embodiment, the radial plane includes an angle of inclination with the latching surface. In particular, the angle of inclination lies between 0 and +70 degrees, so that the latching surface is not self-opening for the headrest. All catching notches preferably exhibit the same angle of inclination. In particular, the angle of inclination is selected in such a way that the latching surface of the catching notch and the locking surface of the locking body run parallel to each other in the latching mode. In particular, the locking surface and latching surface form an intersection line, wherein the intersection line is parallel to the longitudinal axis of the locking body.

The locking body is preferably designed as a longitudinal component. The rounded edge region extends in the longitudinal direction of the locking body. In particular, the locking body is made out of metal and/or plastic. The locking body can be designed as a solid body or hollow body. The cross sectional surface, in particular of the locking body, preferably remains constant over the entire length. Alternatively, the cross sectional surface of the locking body can change over its length. For example, the cross sectional surface of the locking body can conically taper along its longitudinal axis. It is especially preferred that the locking body be a bolt- and/or pin-like locking body.

In an especially preferred structural configuration, the radius of curvature of the rounded edge region is larger than 1 millimeter. The radius of curvature is preferably larger than 5 millimeters, and especially larger than 10 millimeters, but smaller than 5 centimeters. In particular, the radius of curvature remains constant over the entire length of the rounded edge region. Alternatively, the radius of curvature can vary on the length of the rounded edge region. The advantage to this configuration is that the edge radius results in less entanglement while gliding along the sliding surface. This makes it possible to reduce the force necessary to offset the sliding and static friction while displacing the headrest or locking body along the guide rod.

The backrest preferably encompasses an adjustment device for a user to adjust the headrest. When the adjustment device is actuated, the locking body is preferably released from the latching notch and/or catching notch, so that the height of the headrest can be adjusted. In particular, the at least one guide rod is enveloped by the adjustment device, and especially annularly enveloped. By enveloping the guide rod, the adjustment device exerts a counterforce on the guide rod when pressing the locking body against the guide rod, thereby locking the headrest in place.

In an especially preferred embodiment, the adjustment device encompasses a return device, for example a restoring spring. In particular, the locking body is coupled to the restoring device. The restoring device presses and/or retains the locking body in the latching notch. Actuating the restoring device preferably reduces the effect of the restoring device on the locking body, so that the locking body is no longer pressed as strongly and/or at all into the latching notch, for example. For example, actuating the adjustment device causes the restoring spring to expand or compress. In particular, the locking body can be displaced with the adjustment device actuated, so that the locking body can be pushed from a first latching notch into a second latching notch.

Outside of the latching notches, the locking body contacts the guide rod linearly and/or punctiformly, wherein in particular a curved guide rod is punctiformly contacted by the locking body, and a non-curved surface is linearly contacted by the locking body. This makes it possible to reduce the frictional forces between the locking body and guide rod during displacement from a first locking position into a second locking position.

In an especially preferred embodiment, at least one additional latching notch is designed as an adjustment notch. The adjustment notch is preferably designed as depressions, indentations or milled slots. The adjustment notch exhibits at least one adjustment plane, wherein the radial plane of the guide rod includes an adjustment angle with the adjustment plane. The adjustment angle is larger than 10 degrees, and in particular larger than 50 degrees, but maximally 80 degrees. The adjustment notch preferably encompasses a second adjustment plane, wherein the second adjustment plane includes an angle with the radial plane of the guide rod of at least 10 degrees, but maximally 80 degrees. The first and second adjustment planes intersect in the adjustment edge, and form a V-shaped notch.

The adjustment notch is designed to accommodate a locking body. The locking body linearly contacts the adjustment planes. In an especially preferred embodiment, the locking body can engage into the adjustment notch, wherein it engages into the adjustment edge with the rounded edge region, for example.

It is especially preferable that the locking body exhibit a triangular cross section, wherein at least one corner is rounded and comprises the rounded edge region. The corner preferably extends rounded over the entire length of the longitudinal axis of the locking body. Alternatively, the locking body exhibits a rectangular cross section or polygonal cross section or teardrop cross section, wherein at least one corner is rounded and comprises the rounded edge region, which preferably extends over the entire length of the longitudinal axis of the locking body.

BRIEF DESCRIPTION OF THE DRAWINGS

Additional features, advantages and effects of the invention may be gleaned from the following description of preferred exemplary embodiments of the invention. Shown here on:

FIG. 4a is a side view of the cutout on FIG. 3a;

FIG. 4b is a side view of the cutout on FIG. 3b, with a schematic illustration of the contacting options for the locking body;

FIGS. 5a,b,c are three possible cross sectional surfaces of the locking body; and FIG. 6 is a cutout of a headrest assembly with adjustment device.

DETAILED DESCRIPTION

The following detailed description is merely exemplary in nature and is not intended to limit the invention or the application and uses of the invention. Furthermore, there is no intention to be bound by any theory presented in the preceding background of the invention or the following detailed description.

Figure 1:
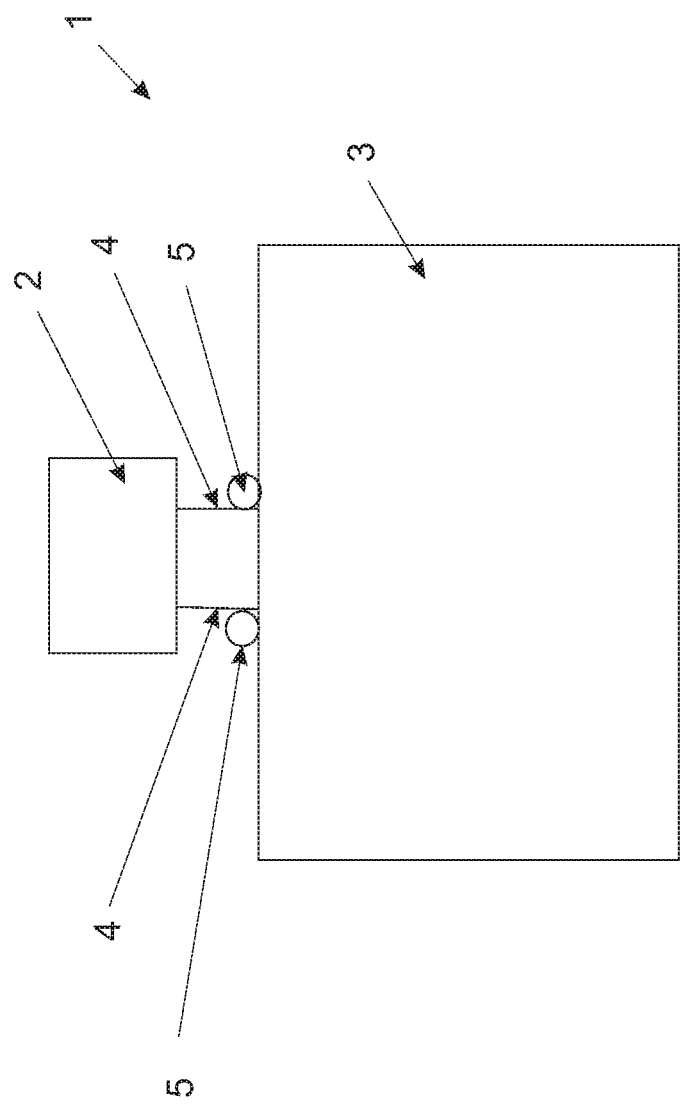
FIG. 1 is a schematic, two-dimensional illustration of a headrest assembly.

FIG. 1 presents a schematized, two-dimensional illustration of a headrest assembly 1, which encompasses a headrest 2, a backrest 3 and two guide rods 4. The two guide rods 4 are undetachably joined with the headrest 2. The two guide rods 4 are inserted into the backrest 3 at the other end, so that the guide rods 4 join the headrest 2 with the backrest 3. The guide rods 4 are inserted into the backrests 3 at receiving locations.

The inserted guide rods 4 can be partially retracted from and inserted into the backrest, thereby enabling a vertical adjustment of the headrest from a first locking position into a second locking position relative to the backrest 3. A locking device 5 is secured to the respective two receiving locations. The locking device 16 is in direct contact with the guide rods 4, and makes it possible to keep the headrest 2 at a constant height, in particular the first locking position or second locking position.

Figure 2:
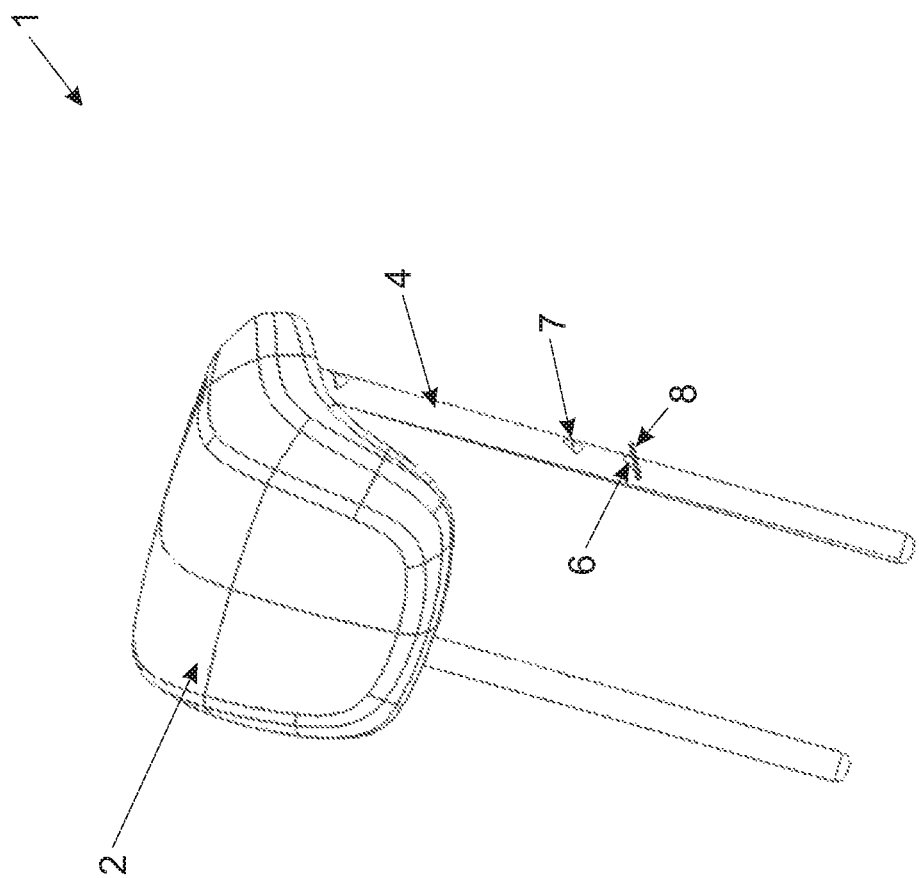
FIG. 2 is a cutout of a headrest assembly with headrest, guide rod and locking body.

FIG. 2 shows a cutout of a headrest assembly 1. The cutout depicts the headrest 2 and two guide rods 4, wherein the guide rods 4 are rigidly joined with the headrest 2. The headrest 2 is designed as a foam body with fabric cover and/or leather cover.

In this exemplary embodiment, the guide rods 4 exhibit a round cross section. Alternatively, the guide rods 4 can also exhibit a rectangular or any other cross section. The guide rods 4 exhibit two latching notches. One latching notch is designed as a catching notch 6. The catching notch 6 comprises the last latching notch before the end of the guide rod 4. The other latching notch is designed as an adjustment notch 7, and located between the headrest 2 and catching notch 6. Several adjustment notches 7 can also be situated between the headrest 2 and catching notch 6.

The adjustment notch 7 exhibits two flattened adjustment surfaces, which form a V-shaped notch in the guide rod 4. The adjustment surfaces are designed as triangular surfaces, wherein the two bases of the triangular surfaces coincide and form the adjustment edge. Of the triangular tips lying opposite the bases, one points in the direction of the headrest 2, and another in the direction of the catching notch 6.

The locking body 8 is engaged into the catching notch 6, and thereby stabilizes the height of the headrest 2. For reasons of clarity, only one locking body 8 is drawn on FIG. 2. However, the headrest assembly 1 does structurally encompass a second latching body 6 at the same height on the other guide rod 4.

Figure 3A:
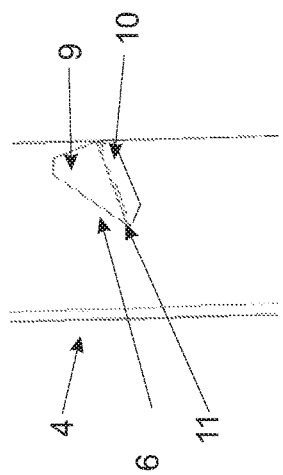
FIG. 3a is a cutout of a headrest assembly with catching notch.
Figure 3B:
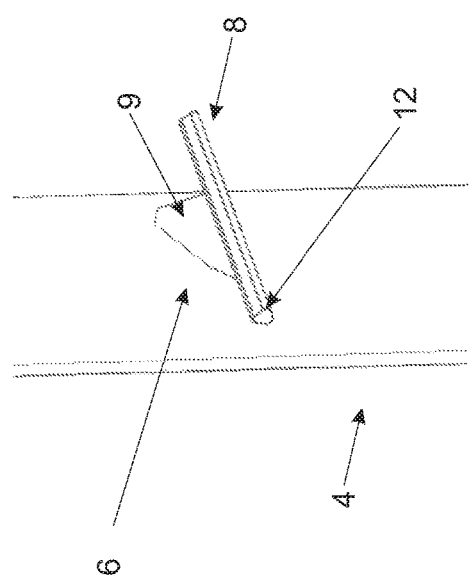
FIG. 3b is a cutout of a headrest assembly with catching notch and locking body.

In a detailed cutout of the headrest assembly 1, FIGS. 3a and 3b present the guide rod 4 with the catching notch 6.

FIG. 3a shows the guide rod 4 with catching notch 6. The catching notch 6 exhibits a sliding surface 9 and a latching surface 10. The latching surface 10 forms a bearing surface for the locking body 8. The latching surface 10 stands perpendicular on the longitudinal axis of the guide rod 4. The latching surface 10 includes an angle with the sliding surface 9 of at least 10 degrees and maximally 80 degrees. The latching surface 10 and sliding surface 9 touch/intersect a straight line of the catching notch edge 11. The catching notch edge 11 stands perpendicular on the normal vector of the radial planes of the guide rod 4.

FIG. 3b shows the same guide rod 4 with a catching notch as on FIG. 3a, along with an engaged locking body 8. The locking body 8 is designed as a bolt-shaped metal pin, wherein the locking body 8 exhibits a longitudinally extending pin length. The pin length is larger than the length of the latching surface 10. In particular, the pin length is larger than 1 centimeter, and smaller than 10 cm. The locking body 8 is designed as a solid body. Alternatively, the locking body 8 can be designed as a hollow body. The locking body 8 exhibits a triangular cross section, wherein all three corners are rounded. The corners are rounded over the entire length of the longitudinal axis of the locking body 8, and form a rounded edge region 12. The longitudinal axis of the locking body 8 stands perpendicular on the longitudinal axis of the guide rod 4. In the locking mode, the locking body 8 is engaged in the catching notch 6, as illustrated. One of the non-curved lateral surfaces rests on the latching surface 10, and this resting surface forms the locking surface 12. The locking surface 13 is positively joined with the latching surface 10, and prevents the headrest 2 from slipping in terms of height.

FIGS. 4a and 4b present a lateral top view of the detailed cutout from FIGS. 3a and 3b, and show the guide rod 4 and catching notch, once with and once without the locking body 8. FIG. 4a shows the catching notch 6, which exhibits a wedge-shaped profile. The latching surface 10 lies in the radial plane of the guide rod 4, and the sliding surface 9 is a surface inclined relative to the axial plane of the guide rod 4.

FIG. 4b shows the locking body 8 in three different vertical positions I, II, III. In the first vertical position I, the headrest assembly 1 is in the locking mode, and the locking body 8 rests on the latching surface 10 of the catching notch 6. The locking body 8 completely engages into the catching notch 6, and does not protrude over the outer edge of the catching notch 6. The surface-to-surface contact between the locking surface 13 of the locking body 8 and the latching surface 10 stabilizes the headrest 2 in terms of its height, and prevents the headrest 2 from detaching and flying around the vehicle interior in the event of an accident.

In the second vertical position II, the headrest assembly 1 is in the adjustment mode. The locking surface 13 of the locking body 8 no longer contacts the latching surface 10. The rounded edge region 12 of the locking body 8 contacts the sliding surface 9. The locking body 8 linearly contacts the sliding surface. To prevent a surface-to-surface contact between the locking body 8 and sliding surface 9, the angle between the radial surface of the guide rod 4 and sliding surface 9 is larger than the angle of the locking body 8 at the edge that glides along the sliding surface 9.

In the third vertical position III, the locking surface 13 of the locking body 8 no longer contacts the latching surface 10. Outside of the catching notch 6, the locking body 8 contacts the guide rod 4 linearly or punctiformly. The locking body 8 punctiformly contacts a curved guide rod 4 outside of the catching notch 6, while the locking body 8 linearly contacts a flat guide rod 4 outside of the catching notch. The punctiform and/or linear contact in the adjustment mode reduces the frictional forces between the locking body 8 and guide rod 4, thereby enabling an easy adjustment with a slight exertion of force.

FIGS. 5a, 5b and 5c show three possible cross sectional surfaces or profiles for the locking body 8. The cross sectional surface of the locking body 8 in 5a is a triangle with three rounded corners. The locking body is arranged in the headrest assembly in such a way that a rounded corner forms a sliding rounded portion 14, wherein the sliding rounded portion 14 is the rounded corner that faces the sliding surface 9 in the adjustment mode and comprises the rounded edge region 12 in the longitudinal direction of the locking body 8. In an alternative configuration, only [one] of the three corners can be rounded, wherein the rounded corner forms the sliding rounded portion. The locking edge 15 adjoins the sliding rounded portion 14, wherein the locking edge 15 comprises the locking surface 13 in the longitudinal extension of the locking body 8.

FIG. 5b shows a cross section through a locking body 8, wherein the cross sectional surface is a rectangle, in which the two shorter rectangle sides are convexly curved. One of the two convex rectangle sides comprises the sliding rounded portion 14, which forms the rounded edge region 12 in the longitudinal direction of the locking body 8. The locking edge 15 adjoins the sliding rounded portion 14, forming the locking surface 13 in the longitudinal extension of the locking body.

The cross section of the locking body 8 shown on FIG. 5c forms a circular segment. The arc of the circular segment comprises the sliding rounded portion 14, and the rounded edge region 12 in the longitudinal extension of the locking body 8. A straight edge adjoins the sliding rounded portion 14, forming the locking edge 15, and forming the locking surface 13 in the longitudinal extension of the locking body 8.

FIG. 6 presents a detailed cutout of the headrest assembly 1 with an adjustment device 16. The adjustment device 16 is preferably secured to the surface of the backrest 3, and joined with the backrest 3 and backrest cover. The adjustment device 16 encompasses a bracket 17 and actuating device 18, wherein the latter envelops the guide rod 4 like a cuff.

The actuating device 18 penetrates through the bracket 17. The adjustment device 16 encompasses a restoring device, which in this embodiment is designed as a restoring spring. The restoring device pulls and holds the locking body 8 against the guide rod 4, in particular pulling the locking body 6 against the guide rod 4.

The actuating device 18 is designed to decouple the restoring device, for example to expand the restoring spring. This reduces the force with which the locking body 8 is pressed against the guide rod 4, and the locking body 8 can be released from the latching notch. In this mode, the locking body 8 can be transferred from a first latching notch into a second latching notch, and the height of the headrest 2 can thereby be adjusted.

The adjustment device 1 additionally encompasses a guide channel 19. The guide channel 19 is directly joined with the mount 17. The guide channel 19 is incorporated into the backrest, and enveloped by the latter. The guide rod 4 is inserted into the guide channel 19 through the bracket 17. The job of the guide channel 19 is to guide the guide rod 4, so as to thereby prevent entanglement with the padding of the backrest 3.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the invention as set forth in the appended claims and their legal equivalents.

The invention claimed is:

1. A headrest assembly for a motor vehicle comprising:
a headrest having an adjustment mode for adjusting the headrest from a first locking position into an at least second locking position and a locking mode for locking the headrest in a locking position;
a backrest having a locking device with a locking body for locking the headrest in the locking position, wherein the locking body includes a planar locking surface and a rounded edge region extending from the planar locking surface; and
at least one guide rod joining the backrest with the headrest, the at least one guide rod having at least two axially spaced apart latching notches, wherein at least one of the latching notches is configured as a catching notch having a latching surface forming a bearing surface and a sliding surface forming a surface inclined relative to an axial plane of the guide rod;
wherein the planar locking surface of the locking body flatly contacts the latching surface in the locking mode, and the rounded edge region linearly contacts the sliding surface in the adjustment mode.

2. The headrest assembly according to claim 1, wherein the latching surface lies in a radial plane of the guide rod.

3. The headrest assembly according to claim 2, wherein the latching surface comprises an angle of inclination with the radial plane, wherein the angle of inclination lies between −70 and +70 degrees.

4. The headrest assembly according to claim 1, wherein at least one additional latching notch comprises an adjustment notch.

5. The headrest assembly according to claim 1, wherein the locking body comprises a bolt-shaped longitudinal component.

6. The headrest assembly according to claim 5, wherein the rounded edge region extends in the longitudinal direction of the locking body.

7. The headrest assembly according to claim 1, wherein the rounded edge region comprises a radius of curvature larger than 1 millimeter.

8. The headrest assembly according to claim 1, wherein a cross section of the locking body comprises a triangular body with at least one rounded corner.

9. The headrest assembly according to claim 1, wherein a cross section of the locking body comprises a rectangular body with at least one rounded corner.

10. The headrest assembly according to claim 1, wherein a cross section of the locking body comprises a polygonal body with at least one rounded corner.

11. The headrest assembly according to claim 1, wherein a cross section of the locking body comprises a teardrop body with at least one rounded corner.

12. The headrest assembly according to claim 1, wherein the backrest comprises an adjustment device for releasing the locking body from the latching notch when the adjustment device is activated.

13. The headrest assembly according to claim 1, wherein the locking body punctiformly contacts the at least one guide rod outside of the latching notches in the adjustment mode.

14. The headrest assembly according to claim 1, wherein the locking body linearly contacts the at least one guide rod outside of the latching notches in the adjustment mode.

15. A headrest assembly for a motor vehicle comprising:
an adjustment device configured to be secured to a seat back, wherein the adjustment device includes a bracket supporting a locking body having a planar locking surface and a rounded edge region extending from the planar locking surface;
a headrest adjustable from a first adjustment position to a second adjustment position and from the second adjustment position to a locking position; and
an guide rod slidably supported in the bracket and having the headrest disposed on a first end thereof, the guide rod having a pair of adjustment surfaces formed therein, which define a V-shaped notch between the headrest and a second end of the guide rod opposite the first end, and a catching notch formed in the guide rod between the V-shaped notch and the second end, wherein the catching notch includes a latching surface formed in a radial plane of the guide rod and a sliding surface intersecting the latching surface at an acute angle;
wherein the locking body is radially positionable into: (i) the V-shaped notch in the second adjustment position such that the rounded edge region linearly contacts the sliding surface; and (ii) the catching notch in the locking position such that the planar locking surface flatly contacts the latching surface.

16. The headrest assembly of claim 15, wherein the adjustment device further comprises a spring radially biasing the locking body toward the guide rod.

17. A seat for a motor vehicle comprising:
a seat back having a backrest surface;
an adjustment device secured to the seat back, wherein the adjustment device includes a bracket supporting a locking body having a planar locking surface and a rounded edge region extending from the planar locking surface;
a headrest adjustable relative to the backrest surface from a first adjustment position to a second adjustment position and from the second adjustment position to a locking position; and
an guide rod slidably supported in the bracket and having the headrest disposed on a first end thereof, the guide rod having a pair of adjustment surfaces formed therein, which define a V-shaped notch between the headrest and a second end of the guide rod opposite the first end, and a catching notch formed in the guide rod between the V-shaped notch and the second end, wherein the catching notch includes a latching surface formed in a radial plane of the guide rod and a sliding surface intersecting the latching surface at an acute angle;
wherein the locking body is radially positionable into: (i) the V-shaped notch in the second adjustment position such that the rounded edge region linearly contacts the sliding surface; and (ii) the catching notch in the locking position such that the planar locking surface flatly contacts the latching surface.

18. A vehicle comprising a body, and a seat supported in the body according to claim 17.

* * * * *